US008408005B2

(12) United States Patent
Panuccio et al.

(10) Patent No.: US 8,408,005 B2
(45) Date of Patent: Apr. 2, 2013

(54) ASU NITROGEN SWEEP GAS IN HYDROGEN SEPARATION MEMBRANE FOR PRODUCTION OF HRSG DUCT BURNER FUEL

(75) Inventors: Gregory J. Panuccio, East Amherst, NY (US); Troy M. Raybold, Colden, NY (US); Agil Jamal, Richmond, TX (US); Raymond Francis Drnevich, Clarence Center, NY (US)

(73) Assignee: Praxair Technology, Inc., Danbury, CT (US)

( * ) Notice: Subject to any disclaimer, the term of this patent is extended or adjusted under 35 U.S.C. 154(b) by 870 days.

(21) Appl. No.: 12/522,347

(22) PCT Filed: Jan. 9, 2008

(86) PCT No.: PCT/US2008/050597
§ 371 (c)(1),
(2), (4) Date: Sep. 14, 2009

(87) PCT Pub. No.: WO2008/127745
PCT Pub. Date: Oct. 23, 2008

(65) Prior Publication Data
US 2010/0077766 A1    Apr. 1, 2010

Related U.S. Application Data

(60) Provisional application No. 60/879,615, filed on Jan. 10, 2007, provisional application No. 60/925,800, filed on Apr. 23, 2007.

(51) Int. Cl.
*F02C 1/00* (2006.01)
(52) U.S. Cl. .......................... 60/772; 60/780
(58) Field of Classification Search ............... 60/39.181, 60/39.182, 39.464, 39.465, 772, 780, 801; 95/47–50
See application file for complete search history.

(56) References Cited

U.S. PATENT DOCUMENTS

| | | | | |
|---|---|---|---|---|
| 4,524,581 A * | 6/1985 | Cascone et al. | ................. | 60/781 |
| 4,931,070 A * | 6/1990 | Prasad | .............................. | 95/52 |
| 7,163,648 B2 | 1/2007 | Asen et al. | | |
| 7,690,204 B2 * | 4/2010 | Drnevich et al. | ............... | 60/780 |
| 2009/0260368 A1* | 10/2009 | Benz et al. | ....................... | 60/780 |
| 2011/0023498 A1* | 2/2011 | De Koeijer et al. | ............ | 60/780 |

OTHER PUBLICATIONS

Bracht, M. et al. "Water Gas Shift Membrane Reactor for $CO_2$ Control in IGCC Systems: Techno-economic Feasibility Study", Elsevier Science Ltd. (1997) Energy Conserv. Mgmt. vol. 38, Suppl. pp. S159-S164.
Bredesen, Rune et al. "High-Temperature Membranes in Power Generation with $CO_2$ Capture". Chemical Engineering and Processing 43 (2004) pp. 1129-1158.
Chiesa, Paolo et al. "$CO_2$ Capture in IGCC Power Plans by Means of Pd-Ag Membranes". Politecnico di Milano—Dipartimento di Energetica, P.zza Leonardo da Vinci, 32—20133 Milan-Italy. 6 pages.
Chiesa, Paolo et al. "$CO_2$ Sequestration From IGCC Power Plants by Means of Metallic Membranes". Journal of Engineering for Gas Turbines and Power, vol. 129 (Jan. 2007) pp. 123-135.
Rao, A. D. "Integration of Air Separation Unit with $H_2$ Separation Membrane Reactor in Coal-Based Power Plant". Proceedings of GT2006. ASME Turbo Expo 2006: Power for Land, Sea and Air (May 8-11, 2006) Barcelona, Spain.12 pages.

* cited by examiner

*Primary Examiner* — Phutthiwat Wongwian
(74) *Attorney, Agent, or Firm* — Iurie A. Schwartz

(57) ABSTRACT

The present invention relates to the use of low pressure N2 from an air separation unit (ASU) for use as a sweep gas in a hydrogen transport membrane (HTM) to increase syngas H2 recovery and make a near-atmospheric pressure (less than or equal to about 25 psia) fuel for supplemental firing in the heat recovery steam generator (HRSG) duct burner.

25 Claims, 3 Drawing Sheets

US 8,408,005 B2

ASU NITROGEN SWEEP GAS IN HYDROGEN SEPARATION MEMBRANE FOR PRODUCTION OF HRSG DUCT BURNER FUEL

CROSS REFERENCE TO RELATED APPLICATIONS

The present invention claims priority both to U.S. patent application Ser. No. 60/879,615, filed Jan. 10, 2007 and to U.S. patent application Ser. No. 60/925,800, filed Apr. 23, 2007, the entire contents of both applications incorporated herein by reference.

GOVERNMENT SUPPORT

The present invention was made in part with support from United States Department of Energy, contract no. DE-FC26-05NT42469. Accordingly, the United States Government may have certain rights to this invention.

FIELD OF THE INVENTION

The present invention relates to the use of low pressure $N_2$ from an air separation unit (ASU) as a sweep gas in a hydrogen transport membrane (HTM) to increase syngas $H_2$ recovery and make a near-atmospheric pressure (less than or equal to about 25 psia) fuel for firing in the heat recovery steam generator (HRSG) duct burner.

BACKGROUND OF THE INVENTION

Conventional IGCC carbon capture methods: The typical process for $CO_2$ capture in an integrated gasification combined cycle (IGCC) plant is well known in the industry. Coal is gasified with $O_2$ at high pressures to produce syngas that is then scrubbed, cleaned, and stripped of $CO_2$ before it is combusted in a gas turbine. Typically, the $CO_2$ is removed from the syngas stream via a physical sorbent like Selexol® or Rectisol®.

The syngas is contacted with lean solvent in a scrubber column where the sorbent absorbs the $CO_2$ and is regenerated by flashing $CO_2$ at successively lower and lower pressures. The low pressure $CO_2$ is compressed to supercritical pressure for sequestration. In this scenario, the $CO_2$ sequestration cost is high because Selexol®-type plants have high capital costs and the $CO_2$ must be pressurized to greater than about 2000 psia from pressures as low as 18 psia.

Carbon capture in IGCC plants with hydrogen membranes: A different approach for syngas processing is to use a hydrogen transport membrane (HTM) to remove $H_2$ from the syngas and leave a $CO_2$-rich stream that can be purified and compressed to supercritical pressure from near-gasifier (e.g., about 350 to 1000 psia) pressure. One way to minimize membrane capital and fuel compression costs in this scenario is to use compressed ASU $N_2$ as a permeate sweep stream to provide a $H_2$—$N_2$ fuel mixture for a gas turbine feed. Compressed $N_2$ sweep decreases $H_2$ permeate partial pressure and minimizes the required membrane area. It also eliminates the need to compress the gas turbine fuel, reduces $NO_x$ emissions, and improves gas turbine performance. This approach is not currently used in industrial practice and it is described in more detail below. While an IGCC plant with carbon capture that utilizes HTM technology may be cost competitive with plants that employ traditional carbon capture methods, there are several issues that may arise in these plant designs. For example, even at high syngas $H_2$ recovery, there is a significant amount of $H_2$ in the membrane retentate that must be removed from the $CO_2$-rich stream for it to be sequestered. Costs related to $CO_2$ purification and compression increase with increasing $H_2$ in the $CO_2$-rich stream.

In addition, in an IGCC plant that produces both electricity and $H_2$, there is often not enough heat in the gas turbine exhaust to superheat the steam that is generated in the IGCC process. It is therefore necessary to fire supplemental fuel in the heat recovery steam generator (HRSG) duct burner to superheat the steam for expansion in the steam turbine.

SUMMARY OF THE INVENTION

In accordance with the present invention, we have developed systems and methods by which low pressure (LP) ASU $N_2$ (for example, less than or equal to about 75 psia) is used as a HTM permeate sweep stream to increase overall syngas $H_2$ recovery and make a near-atmospheric pressure (for example, less than or equal to about 25 psia) fuel for firing in the HRSG duct burner.

In an IGCC plant that has $CO_2$ capture, compressed ASU $N_2$ is used as HTM permeate sweep to produce a fuel for the gas turbine combustor that will minimize $NO_x$ production. In this invention, low pressure (LP) ASU $N_2$ sweep is used in a second HTM to recover additional $H_2$ and make near-atmospheric pressure fuel gas for firing in the HRSG duct burner. The use of ASU $N_2$ sweep decreases $H_2$ permeate partial pressure and increases flux while burning a $H_2$—$N_2$ fuel mixture in both the gas turbine and the duct burner helps to control $NO_x$ emissions. Also, increasing $H_2$ recovery from the syngas decreases the amount of processing required to purify and sequester the $CO_2$-rich membrane retentate, and firing a near-atmospheric pressure $H_2$—$N_2$ fuel mixture in the HRSG duct burner increases process efficiency. In an IGCC plant where electricity and $H_2$ are both produced, burning a near-atmospheric pressure $H_2$—$N_2$ fuel mixture in the HRSG duct burner eliminates the need to supplementary fire depressurized syngas in order to superheat the steam for expansion in the steam turbine.

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION OF THE INVENTION

Figure 1:
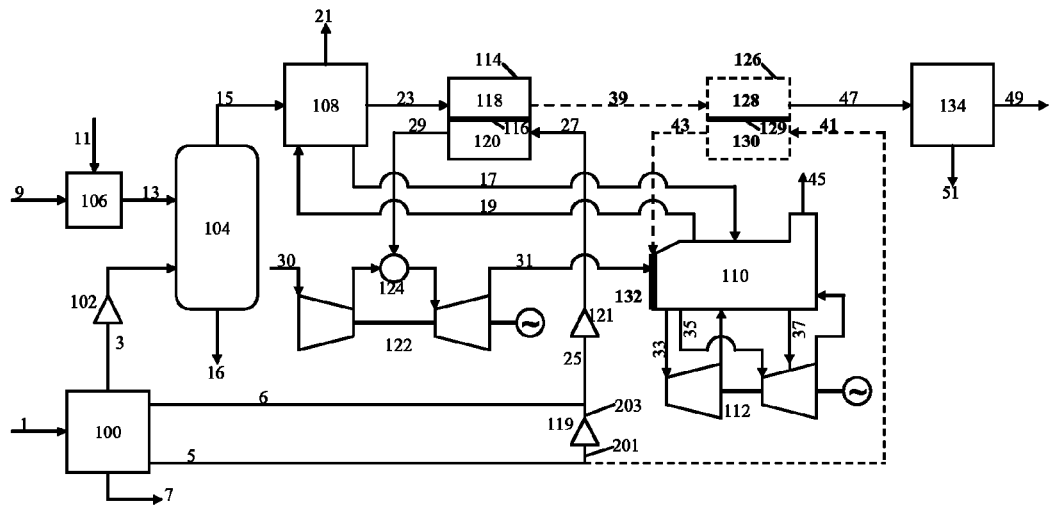
FIG. 1 is a schematic process flow diagram (PFD) illustrating a power-only IGCC plant with carbon capture and HTMs. The second HTM uses low pressure (LP) ASU $N_2$ as a sweep gas to make near-atmospheric pressure fuel for the HRSG duct burner.

In an IGCC plant where $CO_2$ capture is necessary, compressed ASU $N_2$ (for example, equal to or greater than about 125 psia) can be used as an HTM permeate sweep to produce a fuel for the gas turbine combustor that will minimize $NO_x$ production. In accordance with the present invention, low pressure (LP) ASU $N_2$ (for example, less than or equal to about 75 psia) sweep is used in a second HTM to recover additional $H_2$ and make near-atmospheric pressure fuel gas for firing in the HRSG duct burner. The use of ASU $N_2$ sweep decreases $H_2$ permeate partial pressure and increases flux for both HTMs while burning a $H_2$—$N_2$ fuel mixture in both the gas turbine and the duct burner helps to minimize $NO_x$ emissions. Increasing $H_2$ recovery from the syngas by using a hydrogen transport membrane for duct burner fuel (HTM-DB) decreases the amount of processing required to purify and sequester the $CO_2$-rich membrane retentate, and firing a near-atmospheric pressure $H_2$—$N_2$ fuel mixture in the HRSG duct burner increases process efficiency.

In some embodiments of the present invention in which an IGCC plant produces both electricity and $H_2$, burning a low pressure (i.e., near atmospheric) $H_2$—$N_2$ fuel mixture in the HRSG duct burner can eliminate the need to supplementary fire depressurized syngas in order to superheat the steam for expansion in the steam turbine.

The prior art describes IGCC plants with $CO_2$ capture that utilize compressed ASU $N_2$ as sweep gas in a HTM to make gas turbine combustor fuel. The present invention, however, provides for the use of low pressure ASU $N_2$ sweep to make a near-atmospheric pressure $H_2$—$N_2$ fuel mixture for combustion in the HRSG duct burner. The production of a low pressure $H_2$—$N_2$ fuel mixture increases the total $H_2$ recovery from the syngas and decreases the size and complexity of the $CO_2$ purification processing downstream. Also, since a significant quantity of steam is generated in an IGCC plant that must be superheated for steam turbine expansion, the extra energy available to the HRSG from the firing of low pressure fuel adds flexibility to plant operation. In one computer-simulated example in a power-only scenario (i.e. without high-purity $H_2$ production), process efficiency and net power output can increase by about 0.6% if a low pressure $H_2$—$N_2$ fuel mixture is fired in the HRSG duct burner.

In an IGCC plant that produces both $H_2$ and electricity, there may not be enough heat available in the gas turbine exhaust to superheat all the steam in the HRSG. The only other available high level heat is at the exit of the gasifier where it is impractical to superheat the steam because of the severity of the process gas. In this case, combustion of the low pressure $H_2$—$N_2$ fuel mixture in the HRSG duct burner is a better option than firing gasifier syngas or low pressure $H_2$ product to superheat the steam.

Furthermore, the present invention is expected to provide economic advantages over the prior art. In one computer-simulated example for a power-only IGCC plant scenario, analysis shows about $1/MWh cost of electricity (about $2 MM/yr for 280 MW plant) savings for the case that uses a LP ASU $N_2$ swept HTM to make near-atmospheric fuel mixture for firing in the HRSG duct burner. The extra capital needed for the additional membrane area can be offset by capital savings from the simplification of the $CO_2$ purification processing.

To illustrate the present invention, reference is had to the following examples.

EXAMPLE 1

Power-Only IGCC Plant with $CO_2$ Capture

FIG. 1 shows a simplified process flow diagram (PFD) for an embodiment of the present invention in which a power-only (i.e. without high-purity $H_2$ production) IGCC plant with $CO_2$ capture utilizes HTM technology to make a $H_2$—$N_2$ fuel mixture for combustion in the gas turbine and the HRSG duct burner. The portions of the plant representing aspects of the present invention are drawn with dashed lines and/or labeled with bold font in the diagram. While not to be construed as limiting, an exemplary stream summary is given in Table 1 for the computer-simulated example case described below.

TABLE 1

Stream summary for PFD shown in FIG. 1.

| | 9 | 3 | 15 | 23 | 39 | 47 | 49 | 29 | 43 |
|---|---|---|---|---|---|---|---|---|---|
| Flow (lbmol/hr) | | 5809 | 26160 | 38680 | 21270 | 20530 | 12700 | 37680 | 1592 |
| Flow (kpph) | 268.1 | 187.1 | 526.5 | 713.6 | 678.6 | 677.1 | 546.3 | 607.1 | 25.6 |
| Temp (F.) | | | 1971 | 750 | 750 | 750 | 100 | 750 | 750 |
| Pressure (psia) | | | 615 | 500 | 490 | 485 | 2200 | 375 | 20 |
| $H_2$ (%) | | | 32.0 | 47.3 | 4.1 | 0.6 | 1.0 | 45.6 | 45.6 |
| CO (%) | | | 39.9 | 1.3 | 2.4 | 2.5 | 0.5 | 0.0 | 0.0 |
| $CO_2$ (%) | | | 11.0 | 29.9 | 54.4 | 56.3 | 95.3 | 0.0 | 0.0 |
| $H_2O$ (%) | | | 13.7 | 20.2 | 36.7 | 38.0 | 0.0 | 0.6 | 0.6 |
| $N_2$ (%) | | | 1.5 | 1.0 | 1.8 | 1.9 | 3.1 | 53.6 | 53.6 |
| Other (%) | | | 1.9 | 0.3 | 0.6 | 0.7 | 0.1 | 0.2 | 0.2 |

As shown in FIG. 1, air 1 is fed into an ASU 100 where it is separated into $O_2$ 3, $N_2$ streams 5 and 6, and unused products 7. The $O_2$ 3 is compressed in compressor 102 and fed to the gasifier 104 where it is reacted with a slurry 13 (made from coal 9 and water 11 in mixer 106) to form raw syngas 15 and slag 16. In this example, a Conoco-Philips E-Gas® gasifier is modeled for unit 104 that operates at 615 psia and 1970° F.

The raw syngas 15 exiting gasifier 104 is sent to the syngas processing portion of the plant 108 where it is cooled by generating steam 17 from boiler feed water 19. The steam 17 is sent to the heat recovery steam generator (HRSG) 110 for use in the steam turbine 112 steam cycle. Impurities 21 in the raw syngas stream that must be removed could include heavy metals, halides, particulate matter, and/or sulfur-containing compounds. Impurity removal may be accomplished via traditional cold gas cleanup technology in this example, but advanced warm gas cleanup technologies may also be used. To maximize IGCC efficiency and the extent of carbon capture, it is preferred that the syngas processing method be designed such that the impurities are separated without capturing carbon-containing species or $H_2$.

The water gas shift (WGS) reactors, which are also included in the syngas processing portion of the IGCC plant 108 shown in FIG. 1, convert $H_2O$ and CO into $H_2$ and $CO_2$. The WGS reactors are needed to maximize $H_2$ content in the membrane feed and minimize the amount of $CO_2$ purification necessary for sequestration. In this particular example, a two-stage WGS reactor design is used. Computer simulation analysis shows that a design for this Example that uses a high temperature shift reactor (HTS) in series with a medium temperature shift reactor (MTS) is preferred over a design with two high temperature shift reactors in series.

The stream 23 exiting the syngas processing portion of the plant 108 is predominantly made up of $H_2$, $CO_2$, and $H_2O$ and is fed to hydrogen transport membrane (HTM-GT) 114 at near-gasifier pressure (for example, about 350 to 1000 psia). For this study, the hydrogen membrane 116 is a dense transition metal membrane (such as Nb or Ta) that is coated with Pd catalyst on the surface. The Pd catalyzes the dissociation of $H_2$ molecules into H atoms on the syngas side 118 of the membrane. The H atoms then diffuse through the bulk metal to the permeate 120 where Pd catalyzes the re-association of H atoms into $H_2$ molecules that desorb into the bulk gas. This arrangement gives high $H_2$ flux at near 100% selectivity. The advantage of using metals like Nb or Ta for the bulk membrane is that they have high proton flux but cost much less than Pd. However, the membrane surface should be coated with Pd because the bulk metal is not an efficient catalyst for $H_2$ dissociation. It should also be noted that any membrane material(s) with reasonable $H_2$ flux and selectivity would suffice in an IGCC plant for power production. One skilled in the art will appreciate that reasonable $H_2$ flux and selectivity can be determined based on design conditions, processing and economic factors. While not to be construed as limiting, alternative HTMs for use in the present invention could include membranes having $H_2$-selective material formed of one or more of the following: supported or unsupported porous ceramics, dense cermets, dense metals, and/or dense metal alloys.

Figure 2:
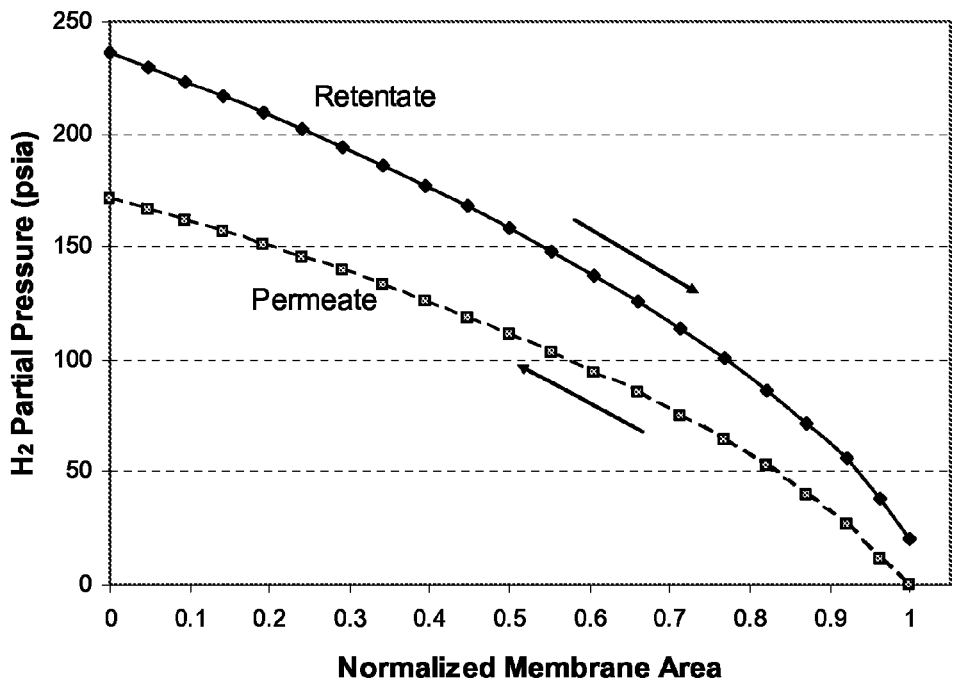
FIG. 2 is a graph illustrating HTM retentate and permeate $H_2$ partial pressure as a function of normalized membrane area from the hydrogen transport membrane for the gas turbine fuel (HTM-GT). In the Example, the retentate side total feed pressure is 500 psia and the permeate side total feed pressure is 385 psia. The two streams are in counter-current flow with one another.

As used in this Example, ASU $N_2$ 6 emerges from ASU 100 at about 190 psia, while ASU $N_2$ 5 emerges from the ASU at about 60 psia. A portion of ASU $N_2$ 5 becomes stream 41. The remaining portion 201 of ASU $N_2$ 5 is compressed in compressor 119 to about 190 psia to form stream 203, which is then combined with ASU $N_2$ 6 to form stream 25. ASU $N_2$ 25 is compressed in compressor 121 in this example to 385 psia and used as HTM-GT 114 permeate sweep 27 in countercurrent flow with the syngas feed 23. $N_2$ is used as a permeate sweep stream to decrease $H_2$ partial pressure, increase $H_2$ flux across the membrane 116, reduce the required membrane area, improve gas turbine 122 performance by increasing the mass flow and molecular weight of the expanding gas, and control the turbine inlet temperature to reduce $NO_x$ emissions. The $H_2$ partial pressure profile in HTM-GT 114 in this Example is shown in FIG. 2. In this example, there is a total pressure drop of 10 psi in the direction of the flow in both the retentate 118 and permeate 120 and the $H_2$ recovery is 95%. The flow of the sweep gas 27 is set such that the lower heating value (LHV) of the resulting $H_2$—$N_2$ fuel mixture 29 is 125 BTU/scf in order to minimize adiabatic flame temperature and $NO_x$ production in the gas turbine combustor 124. The $H_2$ content in the fuel 29 is 45.6 vol % as shown in Table 1. In some cases, it may be possible to increase the $N_2$ sweep flow 27 and decrease the resulting fuel 29 LHV below 125 BTU/scf.

Since pressurized $N_2$ is used as sweep gas 27, the HTM-GT 114 permeate 29 can be directly fed to the gas turbine combustor 124 without further compression. In this example, a General Electric Co. (GE) 7251FB gas turbine 122 generates 230 MW of electrical power from 607.1 thousand pounds per hour (kpph) of fuel 29 and compressed air 30. After expansion, 3770 kpph of exhaust 31 at 1146° F. is sent to the HRSG 110 to generate high pressure steam 33, intermediate pressure steam reheat 35 and low pressure steam 37 for the steam turbine.

Figure 3:
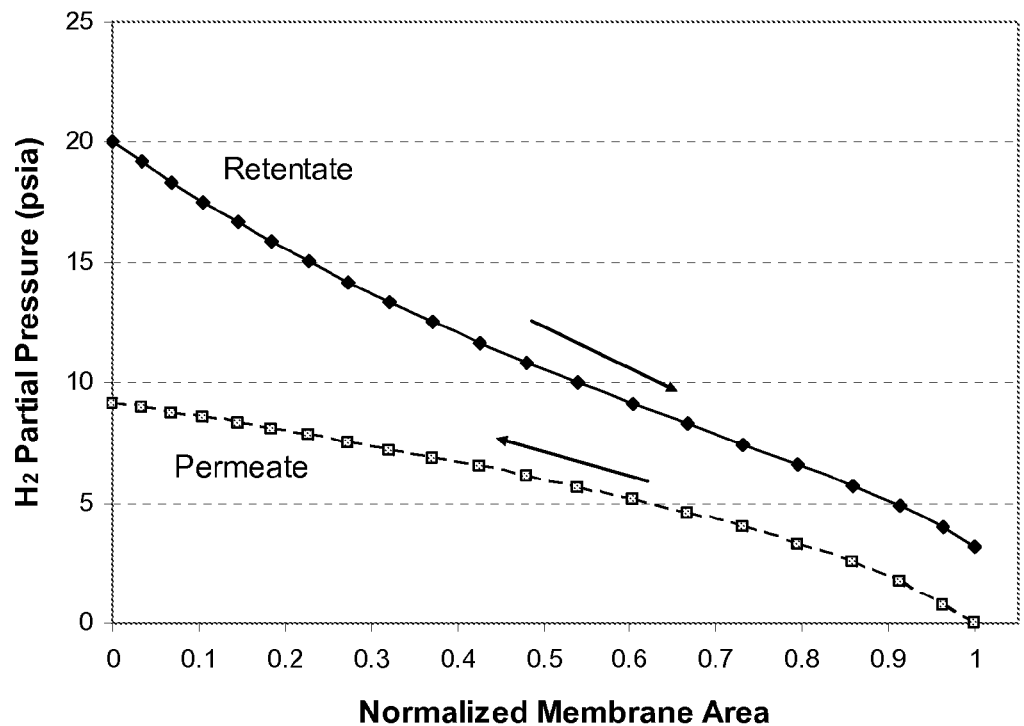
FIG. 3 is a graph illustrating HTM retentate and permeate $H_2$ partial pressure as a function of normalized membrane area from the hydrogen transport membrane for the duct burner fuel (HTM-DB). In the Example, the retentate side and permeate side total feed pressures are 490 psia and 25 psia, respectively. The streams are in counter-current flow with one another.

In this example, the $H_2$ partial pressure in the HTM-GT 114 retentate 39 is 20 psia (see FIG. 2). Eighty-five percent of the remaining $H_2$ is recovered by feeding the $H_2$-depleted syngas 39 from HTM-GT 114 into a second HTM 126 (i.e. HTM-DB) that uses LP ASU $N_2$ 41 as a permeate sweep stream. The permeate produced 43 from this HTM 126 is a near-atmospheric pressure (for example, less than or equal to about 25 psia) mixture of $H_2$ and $N_2$ that can be combusted in the HRSG duct burner 132 to increase the temperature of the gas turbine exhaust 31 and increase the heat available in the HRSG 110. The $N_2$ sweep 41 flow rate to HTM-DB 126 is set such that duct burner fuel 43 LHV is 125 BTU/scf (45.6 vol % $H_2$) in order to minimize additional $NO_x$ emissions from the HRSG stack 45. The $H_2$ partial pressure profile in HTM-DB 126 is shown in FIG. 3. HTM-DB 126 generates 25.6 kpph of $H_2$—$N_2$ fuel mixture 43 exiting from permeate 130 of HTM-DB 126 that is burned in the HRSG duct burner 132 to increase the gas temperature in the HRSG 110 from 1146 to 1209° F. The net process efficiency increases from 32.7 to 32.9% (HHV basis) when HTM-DB 126 is used. If it is available, the $N_2$ sweep flow 41 could be increased such that the LHV of the $H_2$—$N_2$ fuel mixture 43 is as low as 90 BTU/scf. This is possible because there is a longer residence time for combustion in the HRSG 110.

Membrane 129 of HTM-DB 126 preferably has high (approaching 100%) $H_2$ permeation selectivity (e.g. the dense, Pd-coated membrane described above) and flux. Those skilled in the art will appreciate that other HTMs such as those described hereinabove may be suitable for use in accordance with the present invention so long as the desired $H_2$ flux and selectivity are met.

The retentate stream 47 exiting retentate side 128 of HTM-DB 126 is $CO_2$-rich at near-gasifier pressure (for example, about 350-1000 psia). Before this stream 47 can be sequestered, it must be purified, dried, and compressed in the $CO_2$ processing portion of the IGCC plant 134 to produce sequesterable $CO_2$ 49 and waste 51 (e.g., knockout water for catox-based systems) as shown in FIG. 1. Options for $CO_2$ purification in 134 include, but are not limited to, catalytic oxidation of residual combustibles with ASU $O_2$ or $CO_2$ separation via partial condensation. The $CO_2$ purification process can be simplified when HTM-DB 126 is used because there is less $H_2$ to be removed from the $CO_2$-rich stream 47.

It is believed that the best mode for $CO_2$ purification in the examples cited herein is by oxidizing residual combustibles in one or more catalytic oxidation (catox) reactor(s) with ASU $O_2$. There are several reasons including: $O_2$ is readily available and already being produced on-site with an ASU, the extra capacity required for the catox reactor is less than or equal to about 10% of the $O_2$ required for the gasifier, and there are advantages to the process heat integration with the catox unit because the high-level heat generated in the oxidation reactions can be used elsewhere in IGCC plant. In addition, there are also anticipated impurities issues with some alternative methods.

Those skilled in the art will appreciate that the example provided above and the example that follows are intended to be illustrative of the invention and are not to be construed as limiting. Those skilled in the art will also appreciate that the flow, compositions, temperature and pressure ranges as well as heating values and equipment given in the examples are likewise for purposes of illustration. Such examples and parameters could be altered in accordance with the present invention depending on process, equipment, economic considerations and the like. For example, one $N_2$ stream could be withdrawn from ASU 100 rather than streams 5 and 6 (as shown in FIG. 1). This one stream could then subsequently be divided into two streams or portions of $N_2$ (with appropriate compression as needed) for use as the $N_2$ sweep gas streams.

EXAMPLE 2

Figure 4:
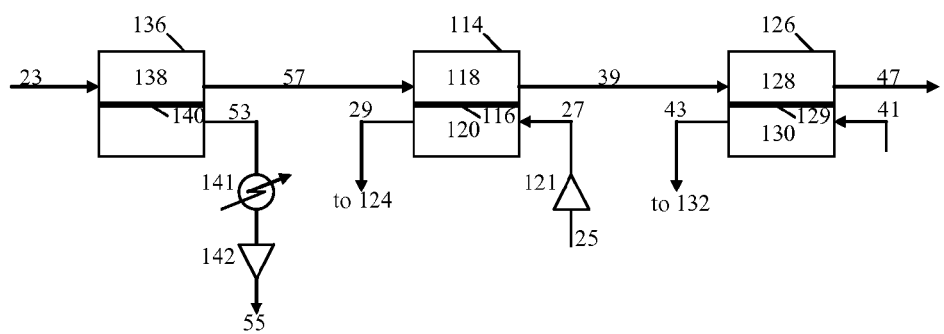
FIG. 4 is a schematic process flow diagram (PFD) illustrating three HTMs arranged in series for production of high-purity $H_2$, gas turbine fuel, and HRSG duct burner fuel in an IGCC plant with carbon capture. The portions of the IGCC plant upstream and downstream of the HTMs are the same as shown in FIG. 1.

Co-Production of $H_2$ and Electrical Power in an IGCC Plant with $CO_2$ Capture An exemplary arrangement of HTMs for co-production of $H_2$ (e.g., high-purity $H_2$) and electrical power in an IGCC plant with $CO_2$ capture in accordance with an alternative embodiment of the present invention is illustrated in FIG. 4. As used in the present invention, "high-purity $H_2$" gas, it is meant $H_2$ gas that is at least 95% by volume $H_2$. More preferably, such gas will be at least 99% by volume $H_2$ and most preferably, such gas will be greater than 99.9% by volume $H_2$. The process flow diagram (PFD) only shows the portions for the HTMs of the IGCC plant. The processing and equipment upstream and downstream of the HTMs can be the same as described above and shown in FIG. 1. The stream summary for this particular computer-simulated example is given in Table 2.

53, membrane 140 with high (near 100%) $H_2$ permeation selectivity (e.g. the dense, Pd-coated membrane described above) should be used in HTM-$H_2$ 136 without $N_2$ sweep in order to avoid the need for permeate 53 purification. Those skilled in the art will appreciate that other HTMs such as those described hereinabove may be suitable for use in accordance with the present invention so long as the desired $H_2$ flux and selectivity are met. The ideal $H_2$ permeate 53 pressure is determined by minimizing product costs as a function of membrane capital and parasitic $H_2$ compression loads. The $H_2$ is cooled in heat exchanger 141 by raising steam or heating process gas or cooling water before it can be compressed in compressor 142 and sent to the pipeline 55.

The retentate 57 from HTM-$H_2$ 136 is fed sequentially to HTM-GT 114 and retentate 39 to HTM-DB 126 where the $H_2$ is recovered to make fuel 29 for the gas turbine combustor 124 and fuel 43 for the HRSG duct burner 132 in a similar fashion as described above. The coal 9 (not shown) flow rate for this exemplary IGCC plant with co-production of power and $H_2$ is the same as the coal 9 flow rate for the previous power-only IGCC plant. A smaller gas turbine 122 is used in this Example of the co-production plant design so that a significant quantity of the $H_2$ can be used to make pipeline product 55 instead of power. Therefore, the gas turbine fuel flow rate in 29 is 253.1 kpph and the gas turbine exhaust flow 31 (not shown) decreases from 3770 to 1696 kpph. The gasifier 104, syngas processing 108, and $CO_2$ purification 134 portions of the IGCC plant are the same size as in Example 1 and generate the same amount of saturated steam 17 that must be superheated in the HRSG 110 for expansion in the steam turbine 112. Due to the decrease in mass flow in 31, the amount of heat available in 110 is much lower and supplemental firing of the HRSG duct burner 132 is critical to maximizing plant performance by avoiding uneconomical steam 17 export or pressure let-down.

There are other options for providing for the duct firing fuel aside from the near-atmospheric pressure $H_2$—$N_2$ fuel mixture described above. For instance, uncompressed $H_2$ product 53 could be burned instead of being sent to the pipeline, some of the syngas 23 could be throttled, or some of the high pressure $H_2$—$N_2$ fuel mixture turbine fuel 29 could be throttled. The low-pressure $H_2$—$N_2$ fuel mixture 43 made by

TABLE 2

Stream summary for PFD shown in FIG. 4.

| | Stream | | | | | |
|---|---|---|---|---|---|---|
| | 23 | 57 | 39 | 47 | 53 | 29 | 43 |
| Flow (lbmol/hr) | 38680 | 30290 | 23030 | 20520 | 8389 | 15710 | 5438 |
| Flow (kpph) | 713.6 | 696.7 | 682.1 | 677.0 | 16.9 | 253.1 | 87.6 |
| Temp (F.) | 750 | 750 | 750 | 750 | 750 | 750 | 750 |
| Pressure (psia) | 500 | 490 | 480 | 475 | 105 | 305 | 20 |
| $H_2$ (%) | 47.3 | 32.6 | 11.4 | 0.6 | 100.0 | 45.6 | 45.6 |
| CO (%) | 1.3 | 1.7 | 2.2 | 2.5 | 0.0 | 0.0 | 0.0 |
| $CO_2$ (%) | 29.9 | 38.2 | 50.2 | 56.3 | 0.0 | 0.0 | 0.0 |
| $H_2O$ (%) | 20.2 | 25.8 | 33.9 | 38.1 | 0.0 | 0.6 | 0.6 |
| $N_2$ (%) | 1.0 | 1.3 | 1.7 | 1.9 | 0.0 | 53.6 | 53.6 |
| Other (%) | 0.3 | 0.4 | 0.6 | 0.6 | 0.0 | 0.2 | 0.2 |

In this particular case and as shown in FIG. 4, the $H_2$-product HTM 136, gas turbine fuel HTM 114, and duct burner fuel HTM 126 are arranged in series. Clean, shifted syngas 23 (same as stream 23 in FIG. 1 and Table 1) is fed to the syngas side 138 of HTM-$H_2$ 136 and $H_2$ 53 is removed from the permeate side of HTM-$H_2$ 136. For high-purity $H_2$ production HTM-DB 126 is the most efficient fuel because the maximum amount of energy from the coal 9 goes through the combined cycle and a high pressure fuel is not used where only low pressure is required. It also maximizes the extent of carbon capture possible and simplifies the $CO_2$ purification process 134.

There are yet other alternative configurations for the IGCC plant that could be used in conjunction with the HRSG duct burner fuel made in 126. For example, the clean, shifted syngas 23 could be cooled to 100° F. and the condensed water could be removed in a knock-out drum. Under these conditions, the $H_2$ content in dried stream 23 entering HTM-GT 114 feed increases and the $H_2$ partial pressure increases. In the power-only IGCC plant, this reduces membrane 116 area but also decreases the total high heating value (HHV) process efficiency. The cost of electricity produced is expected to decrease under these conditions because the sensitivity to membrane capital is higher than the sensitivity to process efficiency.

In the power-only example described above in Example 1, the recovery of $H_2$ from the syngas stream is 95% in HTM-GT 114 and 85% in HTM-DB 126. These values could be adjusted to reduce the cost of electricity.

Integration of water gas shift (WGS) catalyst into the syngas side 118 of HTM-GT 114 is commonly suggested in the literature to increase CO conversion. Though this is an option, sensitivity analysis shows that this is not the best mode for practice because it increases the cost of IGCC products. The amount of membrane area required for $H_2$ separation is minimized if the syngas CO is converted in high temperature and medium temperature shift units in 108 before it is fed to the HTMs.

Figure 5:
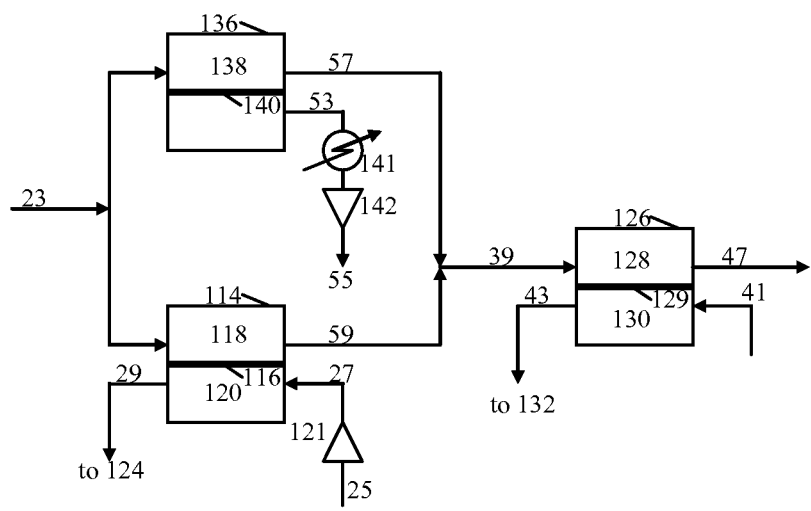
FIG. 5 is a schematic process flow diagram (PFD) illustrating an alternative arrangement for the HTMs in an IGCC plant where both electricity and $H_2$ are produced. The HTM for production of high-purity $H_2$ (HTM-$H_2$) and HTM-GT are arranged in parallel in FIG. 5 instead of in series as in FIG. 4. Note that the stream conditions given in Table 2 do not apply to this case.

In yet another embodiment of the present invention in which an IGCC plant is designed to produce both $H_2$ and electricity, HTM 136 and HTM 114 could be arranged in parallel as shown in FIG. 5. This is contrast to the embodiment of HTMs shown in FIG. 4 in which the HTMs are instead arranged in series. While the reference numerals in FIG. 5 correspond to those in FIG. 4, the stream conditions in Table 2 do not correspond to FIG. 5. Rather, stream conditions for FIG. 5 for this computer-simulated example are shown below in Table 3.

In addition, the use of pressurized superheated steam as a sweep gas in HTM-$H_2$ 136 (FIGS. 4 and 5) can be considered for an IGCC plant in which both $H_2$ and electricity are produced. Similar to the use of compressed ASU $N_2$ as a sweep stream for gas turbine fuel, the use of pressurized superheated steam as a sweep gas in 136 could reduce or eliminate $H_2$ compression costs and reduce membrane area by decreasing the $H_2$ partial pressure in the permeate. In such a case, superheated steam could be taken from the HRSG 110 and fed as a sweep gas to HTM-$H_2$ 136. The $H_2O/H_2$ permeate is cooled, the condensed water is removed via a knock-out drum, and the $H_2$ is dried before it is sent to the pipeline. The condensed water is boiled and superheated in the HRSG or the IGCC process and recycled for use as HTM-$H_2$ sweep.

It may also be possible to use other diluents like superheated steam as permeate sweep gases in HTM-GT 114 or HTM-DB 126, but it is unlikely that this would be the most efficient scenario. If the $H_2/H_2O$ fuel that is produced in the membrane is combusted in the gas turbine 122 or the HRSG duct burner 132, the latent heat of the steam exiting the stack of the HRSG 45 is not recovered.

Although the invention has been described in detail with reference to certain preferred embodiments, those skilled in the art will recognize that there are other embodiments for the processes and apparatus described hereinabove, and that such alternative processes and apparatus are within the spirit and the scope of the claims.

What is claimed is:

1. A process for $H_2$ recovery from a $H_2$-containing gas stream from a gasifier, the process comprising:
   feeding the $H_2$-containing gas stream to a first hydrogen transport membrane (HTM);
   feeding a first portion of nitrogen produced in an air separation unit (ASU) to the first HTM as a HTM permeate sweep stream;

TABLE 3

Stream summary for PFD shown in FIG. 5.

| | Stream | | | | | | | |
|---|---|---|---|---|---|---|---|---|
| | 23 | 57 | 59 | 39 | 47 | 53 | 29 | 43 |
| Flow (lbmol/hr) | 38675 | 12691 | 8868 | 21559 | 20531 | 9857 | 15713 | 2224 |
| Flow (kpph) | 713.6 | 396.2 | 282.9 | 679.1 | 677.1 | 198.7 | 253.2 | 35.8 |
| Temp (F.) | 750 | 750 | 750 | 750 | 750 | 750 | 750 | 750 |
| Pressure (psia) | 500 | 490 | 490 | 490 | 485 | 25 | 305 | 20 |
| $H_2$ (%) | 47.3 | 6.3 | 4.1 | 5.4 | 0.7 | 100.0 | 45.6 | 45.6 |
| CO (%) | 1.3 | 2.3 | 2.4 | 2.4 | 2.5 | 0.0 | 0.0 | 0.0 |
| $CO_2$ (%) | 29.9 | 53.1 | 54.4 | 53.6 | 56.3 | 0.0 | 0.0 | 0.0 |
| $H_2O$ (%) | 20.2 | 35.9 | 36.7 | 36.2 | 38.0 | 0.0 | 0.6 | 0.6 |
| $N_2$ (%) | 1.0 | 1.8 | 1.8 | 1.8 | 1.9 | 0.0 | 53.6 | 53.6 |
| Other (%) | 0.3 | 0.6 | 0.6 | 0.6 | 0.6 | 0.0 | 0.1 | 0.1 |

Simulation results indicate that the cost of $H_2$ product is almost equivalent if the HTMs are arranged in parallel or in series.

Other alternative configurations to consider for an IGCC plant where $H_2$ and electricity are both produced include: withdrawing permeate from HTM-$H_2$ 136 at more than one pressure. The membrane area required for $H_2$ recovery increases with increasing permeate pressure because the driving force decreases between the syngas and permeate. However, $H_2$ product compression costs decrease with increasing permeate pressure. The cost of the $H_2$ product may be minimized by withdrawing portions of the total $H_2$ product at different pressure levels.

recovering a first $H_2$-$N_2$ fuel mixture from the first HTM and supplied to a gas turbine generator;
   feeding a retentate stream from the first HTM to a second hydrogen transport membrane (HTM);
   feeding a second portion of nitrogen produced in the ASU to the second HTM for use as a HTM permeate sweep stream; and
   recovering a second $H_2$-$N_2$ fuel mixture from the second HTM and supply as a fuel to a duct burner of a heat recovery steam generator.

2. The process of claim 1, wherein the first portion of nitrogen is introduced into the first HTM at a pressure of equal to or greater than about 125 psia and wherein the second portion of nitrogen is introduced into the second HTM at a pressure of less than or equal to about 75 psia.

3. The process of claim 1, wherein the second $H_2$-$N_2$ fuel mixture from the second HTM for use a duct burner fuel is at near atmospheric pressure of less than or equal to about 25 psia.

4. The process of claim 1, wherein the $H_2$-containing gas stream fed to the first HIM is at near-gasifier pressure of between about 350 to 1000 psia.

5. The process of claim 1, wherein the first and second HTMs each comprise a $H_2$-selective membrane selected from one or more of the following materials: supported or unsupported porous ceramics, dense cermets, dense metals, and/or dense metal alloys.

6. An apparatus for increasing $H_2$ recovery from a $H_2$-containing gas stream from a gasifier, the apparatus comprising:
an air separation unit (ASU) configured to provide a source of nitrogen;
a first hydrogen transport membrane (HTM) configured to receive a portion of the ASU nitrogen as a first HTM permeate sweep stream and the $H_2$-containing stream to produce an $H_2$ fuel mixture and provide it as a fuel to a gas turbine engine; and
a second hydrogen transport membrane (HTM) configured to receive a second portion of the ASU nitrogen as a second HTM permeate sweep stream and configured to receive retentate from the first HTM to produce a second $H_2$ fuel mixture to supply a burner of a heat recovery steam generator.

7. The apparatus of claim 6, wherein the first and second HTMs each comprise a $H_2$-selective membrane selected from one or more of the following materials: supported or unsupported porous ceramics, dense cermets, dense metals, and/or dense metal alloys.

8. The apparatus of claim 6, further comprising: a third HTM positioned upstream of the first HTM such that retentate from the third HTM can be fed to the first HTM.

9. The apparatus of claim 8, wherein permeate from the third HTM comprises at least about 95% by volume hydrogen.

10. The apparatus of claim 8, wherein the first, second and third HTMs each comprise a $H_2$-selective membrane selected from one or more of the following materials: supported or unsupported porous ceramics, dense cermets, dense metals, and/or dense metal alloys.

11. The apparatus of claim 6, further comprising: a third HTM positioned upstream of the second HTM such that retentate from the third HTM can be fed to the second HTM.

12. The apparatus of claim 6, wherein permeate from the third HTM comprises at least about 95% by volume hydrogen.

13. The apparatus of claim 11, wherein the first, second and third HTMs each comprise a $H_2$-selective membrane selected from one or more of the following materials: supported or unsupported porous ceramics, dense cermets, dense metals, and/or dense metal alloys.

14. A process for $H_2$ recovery from a $H_2$-containing gas stream from a gasifier in power and $H_2$ co-production plants, the process comprising:
feeding a gas stream to a first hydrogen transport membrane (HTM);
recovering $H_2$ permeate from the first HTM;
feeding retentate from the first HTM to a second hydrogen transport membrane;
feeding a first portion of nitrogen produced in an air separation unit (ASU) to the second HTM as a HTM permeate sweep stream;
recovering a first $H_2$-$N_2$ fuel mixture from the second HTM and supplied to a gas turbine engine;
feeding retentate from the second HTM to a third HTM;
feeding a second portion of nitrogen produced in the ASU to the third HTM for use as a HTM permeate sweep stream; and
recovering a second $H_2$-$N_2$ fuel mixture from the third HTM for use a duct burner fuel.

15. The process of claim 14, wherein the $H_2$ permeate from the first HTM comprises at least about 95% by volume hydrogen.

16. The process of claim 14, wherein the first, second and third HTMs each comprise a $H_2$-selective membrane selected from one or more of the following materials: supported or unsupported porous ceramics, dense cermets, dense metals, and/or dense metal alloys.

17. The process of claim 14, wherein the first portion of ASU nitrogen is introduced into the second HTM at a pressure of equal to or greater than about 125 psia and the second portion of ASU nitrogen is introduced into the third HTM at a pressure of less than or equal to about 75 psia.

18. The process of claim 14, wherein the second $H_2$-$N_2$ fuel mixture from the third HTM for use a duct burner fuel is at near atmospheric pressure of less than or equal to about 25 psia.

19. The process of claim 14, wherein the retentate fed to the second HTM is at near-gasifier pressure between about 350 to 1000 psia.

20. A process for $H_2$ recovery from a $H_2$-containing gas stream from a gasifier in power and $H_2$ co-production plants, the process comprising:
feeding a first portion of the $H_2$-containing gas stream to a first hydrogen transport membrane (HTM);
feeding a second portion of the $H_2$-containing gas stream to a second hydrogen transport membrane;
feeding a first portion of nitrogen produced in an air separation unit (ASU) to the second HTM as a HTM permeate sweep stream;
recovering $H_2$ permeate from the first HTM;
recovering a first $H_2$-$N_2$ fuel mixture from the second HTM for use as a gas turbine fuel;
feeding retentate from the first and second HTMs to a third HTM;
feeding a second portion of nitrogen produced in the ASU to the third HTM for use as a HTM permeate sweep stream; and
recovering a second $H_2$-$N_2$ fuel mixture from the third HTM for use a duct burner fuel.

21. The process of claim 20, wherein the $H_2$ permeate from the first HTM comprises at least about 95% by volume hydrogen.

22. The process of claim 20, wherein the first, second and third HTMs each comprise a $H_2$-selective membrane selected from one or more of the following materials: supported or unsupported porous ceramics, dense cermets, dense metals, and/or dense metal alloys.

23. The process of claim 20, wherein the first portion of ASU nitrogen is introduced into the second HTM at a pressure of equal to or greater than about 125 psia and wherein the second portion of ASU nitrogen is introduced into the third HTM at a pressure of less than or equal to about 75 psia.

24. The process of claim 20, wherein the second $H_2$-$N_2$ fuel stream from the third HTM for use a duct burner fuel is at near atmospheric pressure of less than or equal to about 25 psia.

25. The process of claim 20, wherein the $H_2$-containing gas stream fed to the second HTM is at near-gasifier pressure of between about 350 to 1000 psia.

* * * * *